March 31, 1959 P. GAMBS 2,879,689
OCULAR BIOMICROSCOPES
Filed July 19, 1955
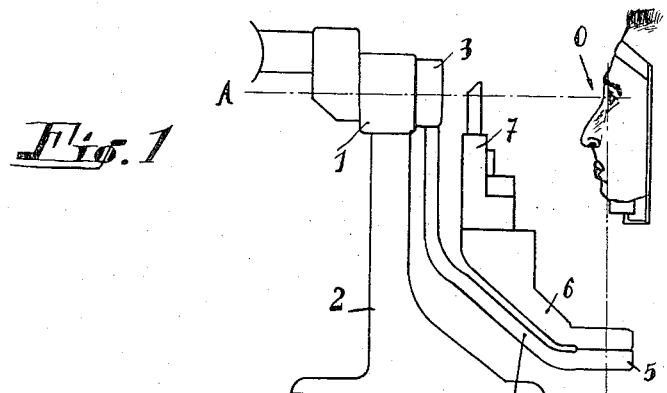
Fig. 1
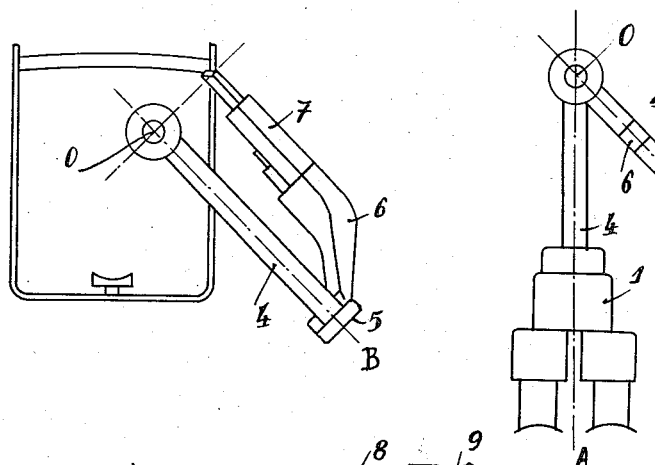
Fig. 2
Fig. 3
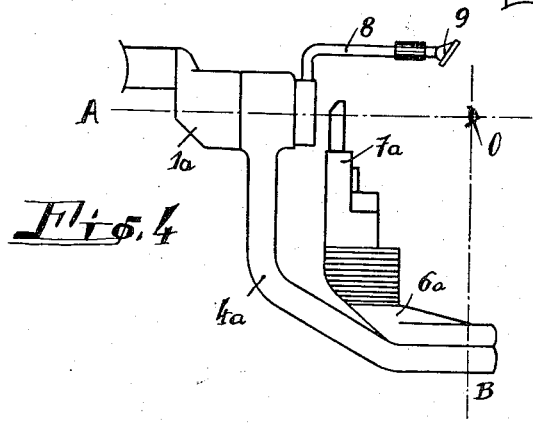
Fig. 4
INVENTOR:
PAUL GAMBS
BY
Richardson, David and Newton
ATTORNEYS.

United States Patent Office 2,879,689
Patented Mar. 31, 1959

2,879,689

OCULAR BIOMICROSCOPES

Paul Gambs, Lyon, France

Application July 19, 1955, Serial No. 523,088

Claims priority, application France September 28, 1954

2 Claims. (Cl. 88—20)

Ocular biomicroscopes are instruments which serve for examining the living eye and more particularly its transparent media while observing with a more or less considerable magnification the optic cross-section produced inside the eye through the projection of a luminous beam.

These instruments include chiefly: an illuminating bulb of the type provided with a slit, which illuminates the eye by projecting into same the optical image of a diaphragm assuming generally the shape of a rectangular slit of an adjustable breadth, a stereo-microscope or cornea microscope through which it is possible to examine with a more or less considerable magnification a predetermined optical cross-section in the eye of the patient, as provided in the patient's eye by the luminous projection beam.

In most of the extant types of ocular biomicroscopes, the slip lamp and the cornea microscope may be shifted along horizontal arcs of a circle having their centers on a common vertical axis registering with and extending underneath the eye which is being examined. Although in certain prior instruments, this common axis is also movable so as to provide for the simultaneous shifting of the slit lamp and of the cornea microscope, when the investigation of the eye is shifted from one point of the latter to another, it is never possible to obtain adjustments of the optical cross-section which allow examination of certain parts of the eye, in particular the upper and lower angles of the front chamber.

Now, I have provided means for removing said drawback of conventional ocular biomicroscopes by giving the practitioner a further degree of freedom for the angular setting of the illuminating beam with reference to the observation axis.

According to a chief feature of my invention, the illuminating means, i. e. the slit lamp is fitted on an arm pivotally secured to a second arm carried by a bearing which is coaxial or substantially coaxial with the observation axis whereby the slit lamp may be shifted over all the points of a spherical cap.

I have illustrated by way of examples and by no means in a binding sense, two preferred embodiments of my improved ocular biomicroscope.

In said drawing, Figs. 1, 2 and 3 illustrate an ocular biomicroscope of the type fitted on a carrier, said figures being respectively a lateral elevational view, a front elevational view and a view from above of the instrument.

Fig. 4 is a side elevational view of a modification of the ocular biomicroscope adapted to be carried in the practitioner's hand.

In the drawing, O designates the location of the eye to be examined; in the case illustrated in Figs. 1 to 3, the biomicroscope includes the opservation means 1, i. e. a cornea microscope carried by a stand 2 to be laid on a table for instance. These observation means 1 include a bearing 3 arranged coaxially with the observation axis OA. Said bearing allows the angular shifting round said axis OA of a bent arm 4 which carries in its turn, a bearing 5 the axis OB of which is perpendicular to the observation axis OA and lies in a vertical plane passing through the eye O. Inside said bearing 5 is housed revolubly a spindle rigid with a second arm 6 carrying the illuminating means 7, i. e. the slit lamp.

The luminous beam produced by said illuminating bulb is directed along the axis CO and the optical section formed in the patient's eye by such a luminous beam is located in the plane BOC defined by the pivotal axis OB and the axis BC of the illuminating means.

The pivoting of the illuminating means 7 round the axis OB allows setting said plane BOC in various planes passing through said axis OB. It is consequently possible to adjust the angle COA formed by the axis of the illuminating beam with the observation axis. It is in particular possible to set the illuminating means 7 in front of the microscope 1 so that the angle COA is then reduced to zero.

The rotation of the arm 4 and consequently of the arm 6 and of the illuminating means 7 round the axis of the bearing 3 allows furthermore setting the axis OB in various directions which are all perpendicular to the observation axis OA.

This arrangement allows therefore the practitioner to examine the eye O of the patient by forming therein optical sections not only in vertical planes but also in oblique planes and in a horizontal plane while the observer may advantageously produce a simultaneous shifting of the slit lamp 7 and of the cornea microscope 1.

In the case of the simplified ocular biomicroscope illustrated in Fig. 4, the observation means 1a are rigid with an arm 8 provided with a rest 9 adapted to be fitted on the forehead of the patient and said observation means carry as precedingly an arm 4a pivotally secured thereto round the observation axis OA. As in the precedingly described case, said arm 4a is provided in its turn with a bearing for the pivotal connection of a second arm 6a forming a support for the slit lamp 7a, the pivotal axis of the two arm being again orthogonal.

This last embodiment provides as in the case described with reference to Figs. 1 to 3 a further degree of freedom for the illuminating means, concerning its adjustable angular setting with reference to the axis of observation.

Obviously, my invention is by no means restricted to the sole embodiments of said ocular biomicroscope which have been disclosed hereinabove by way of a mere exemplification and it covers in contradistinction all the modifications thereof falling within the scope of the accompanying claims.

What I claim is:

1. An ophthalmological eye-examining instrument comprising first and second arms pivotally secured to each other at one end for angular displacement about an axis passing through a location to be assumed by the patient's eye during examination, a support to which the other end of the first arm is pivotally secured for angular displacement about an axis perpendicular to said first-mentioned axis, said last-named axis likewise passing through said location to be assumed by the patient's eye, a cornea microscope carried by said support, the optical axis of said microscope being in alignment with the pivotal axis of said first arm with reference to said support, a slit lamp carried by the free end of the second arm, the axis of said slit being perpendicular to the pivotal axis of the second arm with reference to said first arm and passing through said location to be assumed by the patient's eye.

2. An ophthalmological eye-examining instrument comprising a first and second arm pivotally secured together through cooperating end portions for angular movement about an axis passing through the location to be assumed by the patient's eye during examination, a support to which the other end of the first arm is pivotally secured for movement about an axis perpendicular to said first-mentioned axis, said last-named axis passing through said location to be assumed by the patient's eye, a cornea microscope carried by said support, the optical axis of said microscope being in alignment with the pivotal axis of said first arm with reference to said support, a slit lamp carried by the free end of the second arm, the longitudinal axis of said slit being perpendicular to the pivotal axis of said second arm with reference to said first arm and further passing through said location to be assumed by the patient's eye, and means for detachably securing said support to the patient's head to maintain the point of intersection of the pivotal axes of said first arm with the second arm and of said first arm with said support in register with the patient's eye.

References Cited in the file of this patent

UNITED STATES PATENTS

| | | |
|---|---|---|
| 785,439 | Sayen | Mar. 21, 1905 |
| 1,693,979 | Ferree et al. | Dec. 4, 1928 |
| 1,721,208 | Currier et al. | July 16, 1929 |
| 1,953,738 | Allen et al. | Apr. 3, 1934 |
| 2,622,473 | Littmann | Dec. 23, 1952 |
| 2,765,702 | Sachtleben | Oct. 9, 1956 |

FOREIGN PATENTS

| | | |
|---|---|---|
| 662,940 | Great Britain | Dec. 12, 1951 |
| 843,312 | Germany | Jan. 19, 1953 |